United States Patent [19]

Williams

[11] Patent Number: 4,560,935
[45] Date of Patent: Dec. 24, 1985

[54] REMOTE ACTUATOR FOR METAL DETECTOR DISCRIMINATING ADJUST SWITCH

[76] Inventor: Ronald E. Williams, Rte. 1, Box 739 W, Moore Haven, Fla. 33471

[21] Appl. No.: 479,805

[22] Filed: Mar. 28, 1983

[51] Int. Cl.[4] .......................... G05G 1/00; G01U 3/15
[52] U.S. Cl. ...................................... 324/326; 74/491
[58] Field of Search .............................. 324/326–329, 324/67; 74/491, 481

[56] References Cited

U.S. PATENT DOCUMENTS 3,073,278  1/1963  Brewster ............................... 74/491
3,549,985  12/1970  Penland ................................ 324/326

Primary Examiner—Gerard R. Strecker
Assistant Examiner—Walter E. Snow
Attorney, Agent, or Firm—Harvey B. Jacobson

[57] ABSTRACT

An attachment is provided for a metal detector of the type including an oscillatable discriminating adjust switch operator remote from a hand engageable support handle for the detector. A control actuator is shiftably supported from the detector for back and forth movement of a portion of the actuator along a predetermined path closely adjacent the handle whereby a digit of a hand engaged with the handle may be used to displace the actuator portion along its predetermined path of movement. Connecting structure is provided and operatively connected between the adjust switch operator and the control actuator for oscillation of the adjust switch operator in response to back and forth movement of the control actuator portion.

3 Claims, 5 Drawing Figures

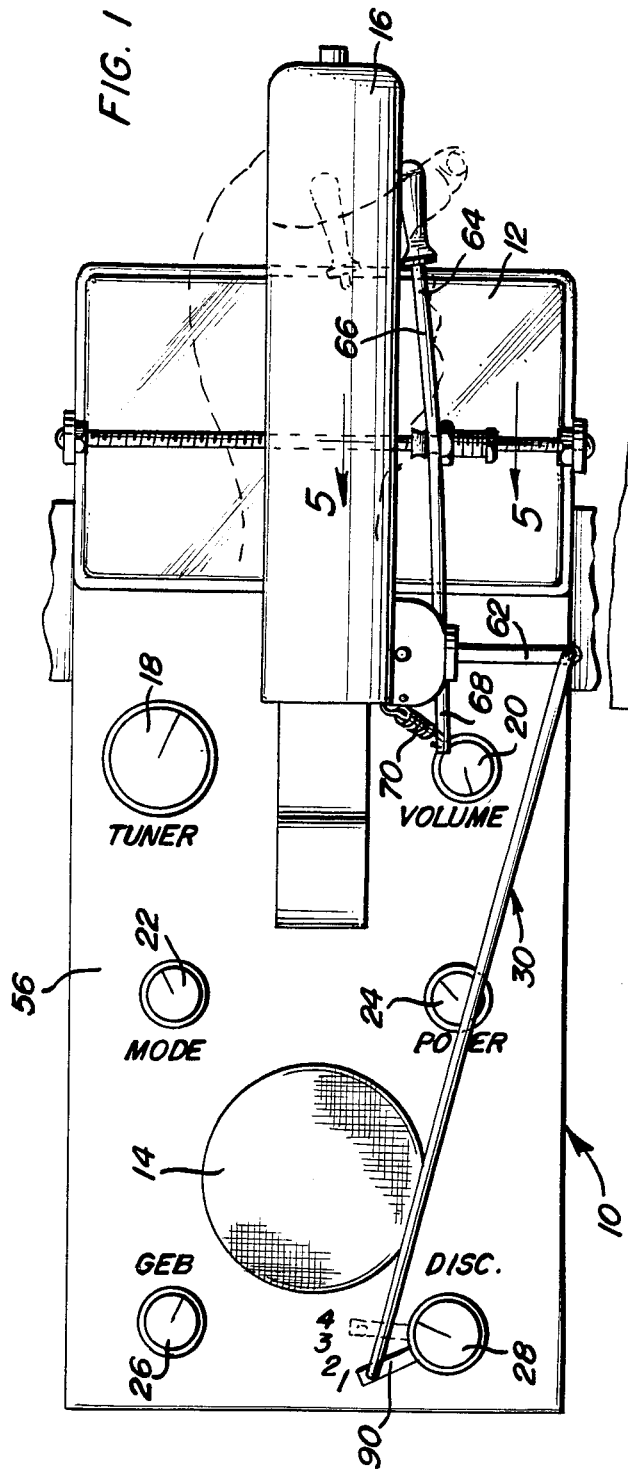
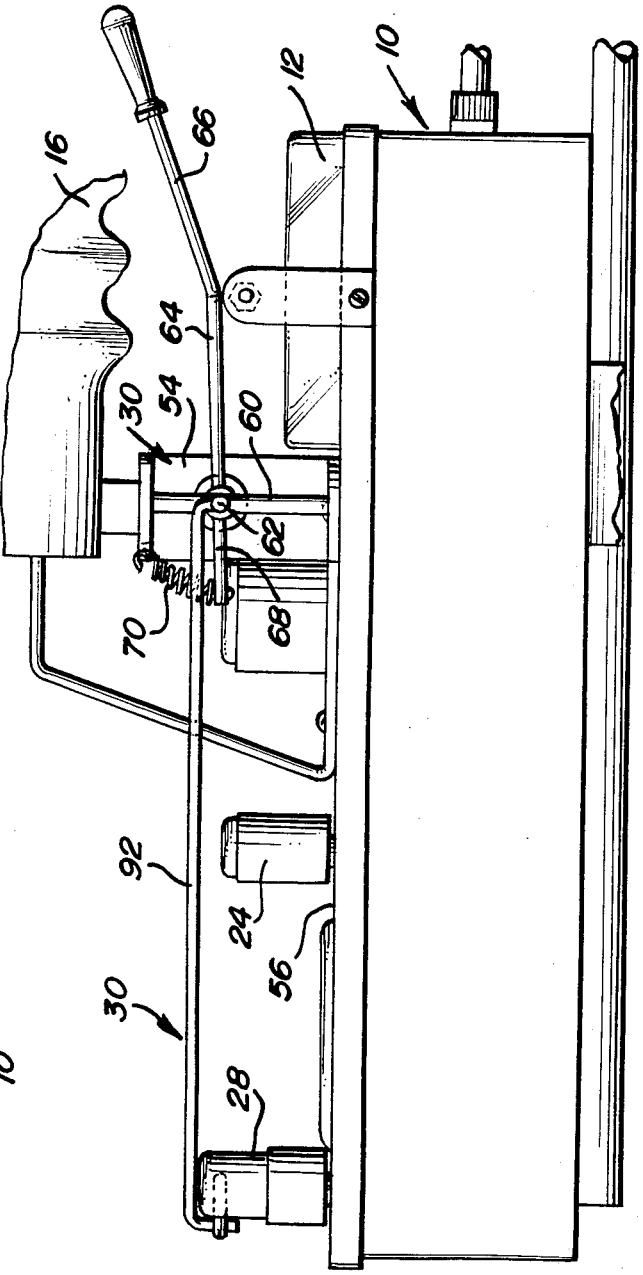

REMOTE ACTUATOR FOR METAL DETECTOR DISCRIMINATING ADJUST SWITCH

BACKGROUND OF THE INVENTION

Many metal detectors include various oscillatable controls which may be preset as desired according to the type of metal detecting operation to be carried out. Some metal detectors include a discriminating adjust switch provided with an oscillatable rotary control knob and the discriminating adjust switch is utilized to discriminate between different types of metals detected by the detector. In locations in which metal can pull tabs may be expected, many operators of metal detectors may set the discriminating switch high enough to reject these pull tabs. However, setting the discrimination switch sufficiently high to reject the pull tabs may render the detector useless in locating small gold, nickel and medium gold items. Accordingly, a person using a metal detector must constantly change the discriminating adjust switch if he is to be able to determine the likelihood of the type of metal detected by the detector.

Assuming that the operator of a detector sets the discriminating adjust switch in the first position, all desirable precious metals will be indicated as well as undesirable pull tabs. If metal is detected, the operator may then adjust the discriminating adjust switch to the second position which will prevent the detector from indicating the presence of precious metals but will enable the detector to continue to indicate the presence of a pull tab. If the signal is still retained with the discriminating adjust switch in the second position, then the operator can move the discriminating adjust switch to the third position. This position will reject a common pull tab. However, if the signal is still retained, there is a probability that the target might be a copper or silver coin. The operator can then move the disciminating adjust switch to the fourth position and to determine if the opject is a copper or silver coin or possibly an aluminum screw cap. The number four position will reject the screw cap and retain the signal on copper and silver coins. Accordingly, proper operation of the discriminating adjust switch is important in saving time and allowing the operator of the detector to dig only for those metals which he is seeking.

However, most metal detectors include a discriminating adjust switch which is remote from the handle of the detector and which thus must be operated by the other hand of the operator. This continuous two-hand operation can be become very tiring. Accordingly, a need exists for a metal detector including a discriminating adjust switch but whereby the discriminating adjust switch may be operated by the hand of the user of the detector from which the detector is supported.

Examples of various different forms of trigger controls and other adjustment structures associated with a handle are disclosed in U.S. Pat. Nos. 2,502,626, 3,549,985, 3,591,740, 3,649,793, 3,711,666, 3,742,341 and 3,875,498. However, these previously known devices are not specifically adapted for use on a metal detector for actuation by the digit of a hand from which the metal detector is supported.

BRIEF DESCRIPTION OF THE INVENTION

The remote actuator of the instant invention comprises an attachment which may be operatively mounted from a conventional metal detector and utilized to provide a means whereby the digit of a hand supporting the detector from a handle thereof may be used to vary the setting of the discriminating adjust switch operator from a location remote from the adjust switch. The adjust switch normally includes an oscillatable operator which may be turned back and forth between the four most commonly used different adjust positions and the attachment is the type wherein the actuator of the attachment to be enagaged by the digit of a hand supporting an associated metal detector is oscillatable back and forth along a substantially straight path and yet operable to rotatably oscillate the adjust switch operator through its four relatively angularly displaced positions.

The main object of this invention is to provide a metal detector of the type including a rotary discriminating adjust switch with an attachment whereby a digit of a hand from which the metal detector is supported may be conveniently utilized to oscillate the adjust switch through its various positions and with the actuator of the attachment including adjustable detents whereby predetermined positions of the adjust switch operator may be indicated by "feel".

Another object of this invention is to provide a remote actuator for a metal detector discriminating adjust switch that may be readily adapted for use on different types of metal detectors.

Still another important object of this invention is to provide an apparatus in accordance with the preceding objects and which will enable effective one-hand operation of a metal detector.

A final object of this invention to be specifically enumerated herein is to provide a device in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view of a typical form of metal detector with which the instant invention is operatively associated;

FIG. 2 is a side elevational view of the assemblage illustrated in FIG. 1;

DETAILED DESCRIPTION OF THE INVENTION

Figure 3:
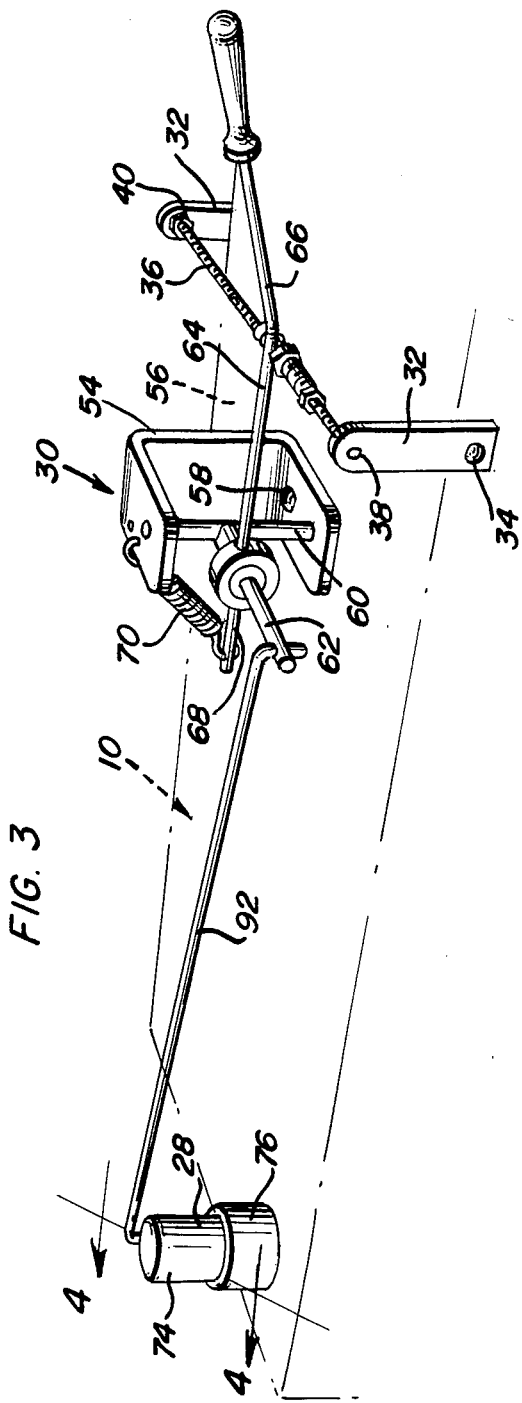
FIG. 3 is a perspective view of the attachment comprising the instant invention illustrated in operative association with the metal detector fragmentarily illustrated in phantom lines.

Referring now more specifically to the drawings the numeral 10 generally designates a conventional form of metal detector such as the COINMASTER, 6000/D, Series 2 metal detector. The metal detector 10 includes the usual needle gauge 12 and sound signal speaker 14 as well as a supporting handle 16. In addition, the metal detector 10 further includes oscillatable tuner, volume, mode, power, GEB and discriminating adjust switch knobs 18, 20, 22, 24, 26 and 28. The knobs 18, 20, 22, 24 and 26 are usually adjusted only occasionally, but the knob 28 often needs to be adjusted as hereinbefore set forth.

With attention now invited more specifically to FIGS. 1, 2 and 3 of the drawings, it may be seen that the attachment or remote actuator for the knob 28 is referred to in general by the reference numeral 30. The actuator includes a pair of opposite side upstanding supports 32 mounted on opposite sides of the forward portion of the metal detector 10 in any convenient manner such as by fasteners 34. A threaded support shaft 36 extends between the upper ends of the upright supports 32. The opposite ends of the shaft 36 are threaded in threaded apertures 38 formed in the supports 32 and jam nuts 40 are threaded on the shaft 36 into tight engagement with the opposing sides of the supports 32. A sleeve 42 is adjustably threaded in position on the support shaft 36 and includes axially spaced circumferentially extending grooves 44 and 46. Further, the sleeve 42 includes a radially outwardly projecting and circumferentially extending shoulder 48 and a jam nut 50 is threaded on the support shaft 36 and jammed against the adjacent end of the sleeve 42 in order to retain its threaded position on the shaft 36. In addition, the shaft 36 includes a notch 52 formed in the upper side thereof.

A horizontally opening U-shaped bracket 54 is mounted on the top wall 56 of the metal detector 10 by a suitable fastener 58 and the U-shaped bracket oscillatably supports a vertical pivot shaft 60 therefrom. The pivot shaft 60 includes a horizontally laterally outwardly projecting stub shaft 62 upon which one end portion of a control actuator shaft 64 is oscillatably supported.

The bracket 54 is disposed to the rear of the shaft 36 and the control actuator shaft 64 includes a forward end portion 66 which projects forwardly beyond the shaft 36 and passes over the latter as well as a rear terminal end portion 68 which projects rearward of the stub shaft 62. An expansion spring 70 is connected between the rear terminal end 68 and an upper portion of the bracket 54 and thus tends to swing the forward end portion 66 of the control actuator shaft 64 downwardly into contact with the threaded support shaft 36. In addition, from FIG. 1 of the drawings, it will be noted that the expansion spring 70 is inclined laterally of the metal detector 10 and, accordingly, the spring 70 also tends to swing the forward end portion 66 of the control actuator shaft 64 toward the right side of the metal detector 10.

The knob 28 is mounted upon the oscillatable discriminating adjust switch operator shaft 72 and includes upper and lower portions 74 and 76. The lower portion 76 includes a vertical bore 78 formed therein including a lower counterbore 80 and the upper portion includes a downwardly opening blind bore 82 registered with the bore 78. A sleeve 84 has its upper end received in the blind bore 82 and its lower end extends through the bore 78 and is telescoped over the shaft 72. The knob lower portion 76 includes a setscrew 86 for engaging the sleeve 84 and slightly deforming the latter into tight frictional engagement with the shaft 72 and the upper portion 74 includes a setscrew 88 whereby the angular positioning of the upper portion 74 may be adjusted relative to the angular position of the lower portion 76. The upper portion 74 additionally includes a laterally outwardly projecting crankarm 90 and one end of a connecting link 92 is pivotally connected to the outer end of the crankarm 90 as at 94 and the other end of the connecting link 92 is pivotally connected to the outer end of the stub shaft 62.

Figure 5:
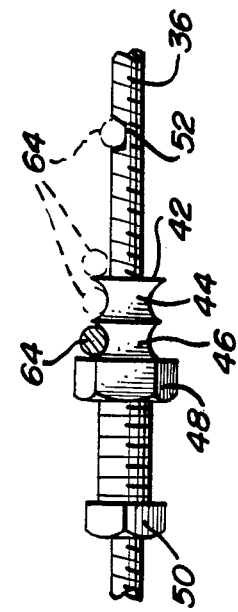
FIG. 5 is an enlarged fragmentary vertical sectional view taken substantially upon the plane indicated by the section line 5—5 of FIG. 1.
Figure 4:
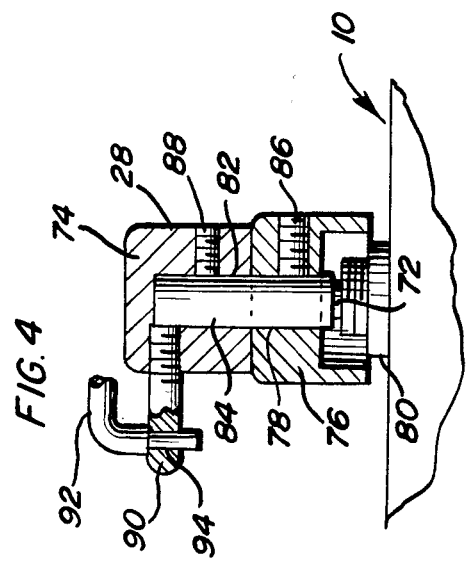
FIG. 4 is an enlarged vertical sectional view taken substantially upon the plane indicated by the section line 4—4 of FIG. 3.

Accordingly, and with attention invited to FIGS. 1 and 5 of the drawings, when the free forward end of the control actuator shaft 64 is deflected by digital pressure toward the left side of the metal detector 10 so that the shaft 64 is seated in the notch 52, the crankarm 90 will be in the number four position thereof illustrated in phantom lines in FIG. 1. On the other hand, when the control actuator shaft is allowed to move to the left from the notch 52 in FIG. 5 into engagement with the adjacent end of the sleeve 42, the crankarm 90 will be in position number three indicated in FIG. 1. Also, when the control actuator shaft 64 is seated in the groove 44 the crankarm 90 will be in the second position illustrated in FIG. 1 and when the actuator shaft 64 is seated in the groove 46 illustrated in FIG. 5 the crankarm 90 will be in the number one position illustrated in FIG. 1.

It is again pointed out that the upper portion 74 of the knob 28 may be angularly adjusted relative to the lower portion 76. In this manner, a person using the metal detector 10 and the attachment 30 may pre-tune the attachment 30 so that the various positions of the actuator 64 illustrated in phantom lines in FIG. 5 of the drawings may render the desired settings of the adjust switch operator shaft 74.

Inasmuch as the handle 16 is positioned but slightly above the forward end portion 66 of the control actuator shaft 64, lateral deflection of the control actuator shaft 64 may be readily accomplished by a selected digit of the hand by which the handle 16 is gripped. Accordingly, the discriminating adjust switch shaft 72 may be oscillated as desired from the handle 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a metal detector of the type including an oscillatable discriminating adjust switch operator remote from a hand engageable support handle for the detector, a control actuator shiftably supported from said detector for back and forth movement of a portion of said actuator along a predetermined path closely adjacent said handle and engageable by a digit of a hand grasping said handle for displacing said actuator along said predetermined path, and connecting means operatively connecting said control actuator and said switch actuator for oscillation of the latter in response to back and forth movement of the control actuator, detent means with which said control actuator is operatively engageable for tactile indication of predetermined positions of said actuator along said predetermined path, said detent means including adjustment means operative to selectively adjust said predetermined positions along said predetermined path and relative to each other along said path, said connecting means including adjustment structure operative to selectively adjust the positioning of said control actuator along said path relative to a predetermined position of said switch actuator.

2. The combination of claim 1 wherein said predetermined path comprises a substantially straight path.

3. The combination of claim 1 wherein said detent means includes means defining detent notches spaced along said path, said control actuator including a pivot shaft mounted for oscillation about an axis laterally spaced from and disposed transverse to said path, a stub shaft carried by said pivot shaft, disposed generally normal thereto and swingable in a plane generally paralleling said path upon oscillation of said pivot shaft, an actuator shaft having one end oscillatably supported from said stub shaft and the other end thereof disposed transverse to and closely adjacent one side of said path, means yieldingly biasing said actuator shaft about said stub shaft in direction to engage said other end of said actuator shaft with said detent notches, and motion transmitting means operatively connected between the outer end portion of said stub shaft and a crank arm portion carried by said adjust switch operator.

* * * * *